T. RASPET.
NUT LOCK.
APPLICATION FILED JUNE 30, 1920.
1,362,509.
Patented Dec. 14, 1920.
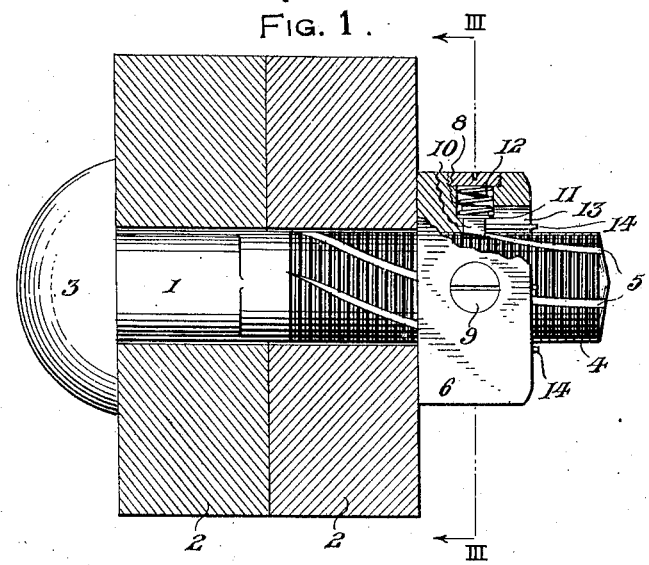
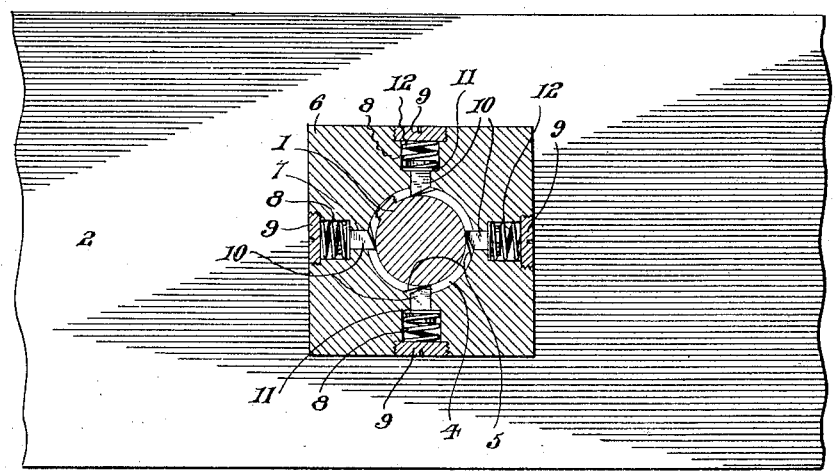
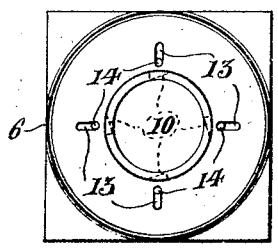
Inventor
T. Raspet
By N. M. Wilson,
Attorney

UNITED STATES PATENT OFFICE.

THOMAS RASPET, OF MEADOW LANDS, PENNSYLVANIA.

NUT-LOCK.

1,362,509.  Specification of Letters Patent.  Patented Dec. 14, 1920.

Application filed June 30, 1920. Serial No. 393,058.

*To all whom it may concern:*

Be it known that I, THOMAS RASPET, a citizen of Jugo-Slavia, residing at Meadow Lands, in the county of Washington and State of Pennsylvania, have invented certain new and useful Improvements in Nut-Locks, of which the following is a specification.

This invention relates to certain new and useful improvements in nut locks and has for its primary object to provide a nut lock of the type wherein the bolt is provided with grooves for receiving tensioned ratchet devices carried by the nut, the ratchet devices being manually controlled to release the same from the bolt grooves from a point exteriorly of the nut.

With the above object in view and others that will appear as the nature of the invention is better understood, the same consists in the novel combination and arrangement of parts hereinafter more fully described in connection with the accompanying drawing.

In the drawing, wherein like reference characters indicate corresponding parts throughout the several views, Figure 1 is a sectional view of a combined nut and bolt constructed in accordance with the present invention, part of the nut being shown in elevation and part in section, Fig. 2 is a cross sectional view taken on line III—III of Fig. 1, showing the ratchet devices carried by the nut, and Fig. 3 is an end elevational view of the nut and bolt assembled.

Referring more in detail to the accompanying drawing, there is illustrated a bolt 1 passing through bodies 2, the bolt being provided with a head 3 on one end while the opposite end thereof is threaded as at 4. As shown more clearly in Fig. 1, the threaded end 4 of the bolt 1 is provided with spiral grooves 5 circumferentially spaced on the bolt and extending over the threaded portion thereof, the spiral pitch of the grooves deviating only slightly from the longitudinal axis of the bolt. A lock nut 6 having a threaded bore is screwed upon the threaded end 4 of the bolt and carries ratchet devices for reception in the spiral grooves 5. The mounting of the ratchet devices includes the provision of a rectangular opening 7 in each side wall of the nut 6, opening at the inner ends in the bore of the nut while the outer ends thereof are provided with enlarged chambers 8 that are closed by screw plugs 9. A ratchet pawl 10 is slidably mounted in the opening 7 and has a beveled inner end projecting into the bore of the nut, the rear end of the ratchet pawl 10 extending into the enlarged chamber 8 and carrying a peripheral flange 11 to be engaged by the spring 12 positioned in the chamber 8 and contacting at its other end the screw plug 9. The ratchet pawls 10 are resiliently mounted for sliding transversely of the nut 6 for engagement in the spiral grooves 5 of the bolt, the ratchet pawls passing over the screw threads 4 until the same engage in the spiral grooves 5, at which time a retrograde movement of the nut is prevented in view of the beveled engaging end thereof. In order to effect a release of the ratchet pawls 10 from the bolt 1, devices are provided for manual operation exteriorly of the nut and include the provision of an opening 13 provided in each side of the nut and extending from the outer side of the nut to the opening 7 and chamber 8, a pin 14 being carried by each ratchet pawl 10 and projecting outwardly through the opening 13 to a position to be engaged by the operator for moving the ratchet pawls 10 against the tension of the springs 12. The nut 6 is screwed onto the threaded end 4 of the bolt to the position shown in Fig. 1 for engagement with the adjacent body 2, at which time, one or more of the ratchet pawls 10 will have been received in the spiral grooves 5, the groove and ratchet pawl operating to prevent a retrograde movement of the nut. When it is desired to remove the nut from the bolt, the pins 14 are engaged to shift the ratchet pawls 10 against the tension of the springs 12 to remove the same from the grooves 5, at which time the nut may be freely rotated on the bolt to be removed therefrom.

While there is herein shown and described the preferred embodiment of the present invention, it is nevertheless to be understood that minor changes may be made therein without departing from the spirit and scope of the invention as claimed.

What is claimed as new is:—

A nut lock comprising a threaded bolt having longitudinally extending grooves in the threaded portion thereof, a nut threaded on said bolt, ratchet pawls carried by the nut for reception in the bolt grooves, a socket in the nut for each pawl having an intermediate cylindrical portion, extending radially of the nut, the inner end of the cylindrical portion communicating with a rectangular bore terminating at the central opening in the nut, the outer end of the cylindrical portion being enlarged and internally threaded, a pawl rectangular in cross section slidably extending through the rectangular bore in the nut, a circular head carried by the outer end of the pawl and slidable in the cylindrical portion of said socket, a compression spring within said cylindrical socket engaging the outer face of the pawl disk, a screw plug threaded in the outer end of the socket engaging the outer end of the spring, said nut being provided with recesses communicating with the pawl receiving sockets and a pin carried by each pawl slidable in said recess and extending exteriorly of said nut for manually shifting the pawls to disengaging position relative to the bolts.

In testimony whereof I affix my signature.

THOMAS RASPET.